United States Patent [19]
Koike et al.

[11] Patent Number: 6,034,207
[45] Date of Patent: Mar. 7, 2000

[54] POLYMERS OF HEXAFLUOROPROPENE OXIDE AND PROCESS OF MAKING

[75] Inventors: Noriyuki Koike; Takashi Matsuda; Shinichi Sato, all of Usui-gun, Japan

[73] Assignee: Shin-Etsu Chemical Co., Ltd., Tokyo, Japan

[21] Appl. No.: 09/285,008

[22] Filed: Apr. 1, 1999

[30] Foreign Application Priority Data

Apr. 1, 1998 [JP] Japan .................................. 10-105853

[51] Int. Cl.[7] .............................. C08G 65/22; C08K 5/06
[52] U.S. Cl. ............................... 528/402; 528/26; 528/70; 528/341; 528/425; 525/180; 525/187; 525/190; 525/191; 568/615; 524/755; 524/757; 524/792; 524/795; 524/839; 524/845
[58] Field of Search ................................ 528/26, 70, 341, 528/402, 425; 525/180, 187, 190, 191; 568/615; 524/755, 757, 792, 795, 839, 845

[56] References Cited

U.S. PATENT DOCUMENTS

| 3,660,315 | 5/1972 | Hill et al. . |
| 4,356,291 | 10/1982 | Darling . |

FOREIGN PATENT DOCUMENTS

| 5360 | 2/1978 | Japan . |
| 57-175185 | 10/1982 | Japan . |
| 7-149889 | 6/1995 | Japan . |
| 7-165832 | 6/1995 | Japan . |
| 9-286853 | 11/1997 | Japan . |
| 10-147639 | 6/1998 | Japan . |
| 10-158387 | 6/1998 | Japan . |

OTHER PUBLICATIONS

Hill, James T., *Macromol. Sci.–Chem.*, A8(3), pp. 499–520 (1974).
Patent Abstracts of Japan, 07149889.
Patent Abstracts of Japan, 07165832.
Patent Abstracts of Japan, 09286853.
Patent Abstracts of Japan, 10147639.

*Primary Examiner*—Samuel A. Acquah
*Attorney, Agent, or Firm*—Millen, White, Zelano & Branigan, P.C.

[57] ABSTRACT

A hexafluoropropene oxide polymer of formula (1) having a dispersity Mw/mn of up to 1.10 is useful as a raw material for liquid rubber. In formula (1), R is —COF, —I, —Br, —CH$_2$OH, —CH$_2$OCH$_2$CH=CH$_2$, —COOR$^1$ or —CONR$^2$R$^3$ wherein R$^1$, R$^2$ and R$^3$ are independently hydrogen or monovalent C$_{1-20}$ hydrocarbon groups which may contain N, O, Si or S, or R$^2$ and R$^3$ form a ring with the N atom, Rf is a C$_{1-6}$ perfluoroalkylene group or a C$_{2-10}$ perfluorooxyalkylene group, and x+y=30 to 400.

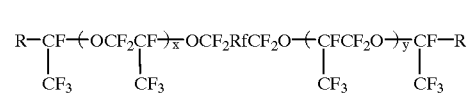

(1)

7 Claims, No Drawings

POLYMERS OF HEXAFLUOROPROPENE OXIDE AND PROCESS OF MAKING

BACKGROUND OF THE INVENTION

1. Field of the Invention

This invention relates to polymers of hexafluoropropene oxide (to be abbreviated as HFPO, hereinafter) and more particularly, to difunctional HFPO polymers having a narrow dispersity or molecular weight distribution. It also relates to a process for preparing the HFPO polymers.

2. Prior Art

Difunctional HFPO polymers are known in the art. For example, U.S. Pat. No. 3,250,807 discloses that difunctional HFPO polymers are prepared by reacting HFPO with $FOC\text{---}(CF_2)_n\text{---}COF$ wherein n is from 0 to 6, in an aprotic polar solvent in the presence of a catalyst such as an alkali metal fluoride or activated carbon according to the following reaction scheme.

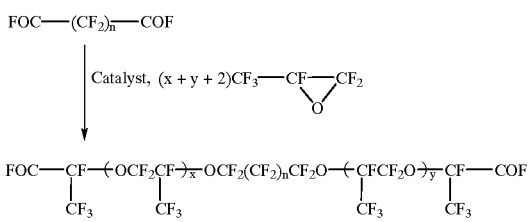

Such an attempt to add HFPO to the preformed —COF groups often gives rise to the problem that a HFPO polymer having a hexafluoropropyl group only at one end (that is, monofunctional HFPO polymer) is formed as a by-product due to chain transfer reaction as shown below.

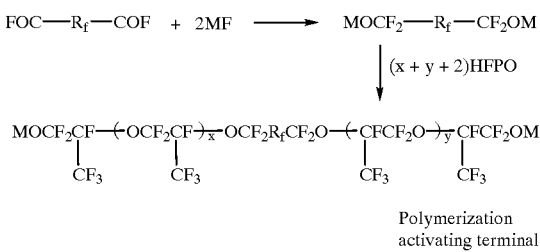

Polymerization activating terminal

Chain transfer

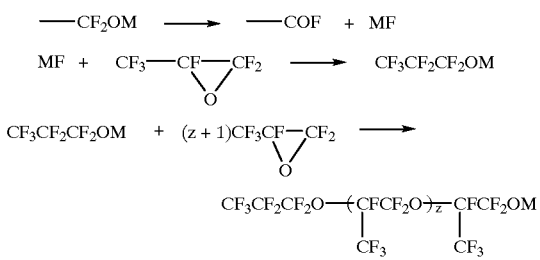

An improved process for producing difunctional HFPO polymers of high purity while preventing the chain transfer is disclosed in JP-B 5360/1978 and U.S. Pat. No. 3,660,315. According to the process disclosed therein, $FOCCF(CF_3)OCF_2CF_2OCF(CF_3)COF$ is mixed with cesium fluoride in tetraethylene glycol dimethyl ether to form $CsOCF_2CF(CF_3)OCF_2CF_2OCF(CF_3)CF_2OCs$. The excess of cesium fluoride is separated from the solution to give a homogeneous solution. The homogeneous solution is used as a polymerization initiator for the preparation of HFPO polymer. Polymerization is carried out at low temperatures of $-60°$ C. to $-30°$ C. yielding a pure difunctional HFPO polymer having a number average degree of polymerization of about 50.

However, J. Macromol. Sci. Chem., A8 (3), 499 (1974) describes that if the molar ratio of HFPO to the initiator is increased in an attempt to produce a difunctional HFPO polymer having a high degree of polymerization, the formation of a monofunctional HFPO polymer by-product is increased and the purity of the difunctional HFPO polymer is reduced. JP-A 175185/1982 and U.S. Pat. No. 4,356,291 describe that a HFPO polymer having a number average degree of polymerization of 445 is obtained by using highly purified HFPO along with the above-described initiator although no reference is made to the formation of a monofunctional HFPO polymer by-product and the purity of the resulting difunctional HFPO polymer.

The prior art research works regarding difunctional HFPO polymers focused at the reduction of monofunctional HFPO polymer by-product resulting from chain transfer and the production of HFPO polymer having a high degree of polymerization.

It is now under development to form liquid rubber using difunctional HFPO polymer as the raw material as described in JP-A 77777/1997, 95615/1997, and 137027/1997. In this application, if a monofunctional HFPO polymer is admixed in the raw material, it gives detrimental influences such as the deteriorated physical properties of the resulting rubber and the hindrance of curing reaction. According to the inventor' finding, the most detrimental among these influences is that the dispersity of difunctional HFPO polymer as the raw material has a significant influence on the viscosity and flow properties of the compound and the physical properties of the cured rubber. If difunctional HFPO polymers as the raw material are different in dispersity, there results a significant difference in compound viscosity and cured rubber properties even though they have an identical degree of polymerization.

Accordingly, there is a desire to have a difunctional HFPO polymer having a narrow dispersity and a low content of monofunctional HFPO polymer so that it is suitable as a raw material for liquid rubber.

SUMMARY OF THE INVENTION

An object of the invention is to provide a difunctional HFPO polymer having a narrow dispersity and a low content of monofunctional HFPO polymer. Another object is to provide a process for preparing the HFPO polymer.

We have found that a difunctional HFPO polymer having a narrow dispersity and a low content of monofunctional HFPO polymer is obtained by pretreating a solution of a polymerization initiator with a perfluoroolefin, adding a solvent having a low freezing point to the polymerization initiator solution to reduce its viscosity before or after the pretreatment, and feeding HFPO to the polymerization initiator solution for polymerizing HFPO while thoroughly agitating the reaction solution and strictly controlling the feed rate of HFPO.

More specifically, the above-mentioned prior art HFPO polymers have a dispersity, which is defined as a weight average molecular weight (Mw) divided by a number average molecular weight (Mn), in excess of 1.10, typically in the range of about 1.15 to 2.0. Such HFPO polymers having a greater dispersity are undesirable as the raw material from which liquid rubber is prepared.

The polymerization initiator used herein is preferably a compound represented by the following general formula (2):

wherein Rf is a perfluoroalkylene group of 1 to 6 carbon atoms or a perfluorooxyalkylene group of 2 to 10 carbon atoms having an ether bond, which may contain a cyclic structure. Preferably HFPO is reacted with the polymerization initiator, thereby yielding a difunctional HFPO polymer essentially represented by the following general formula (1a):

wherein Rf is as defined above, x and y are positive numbers and the sum of x and y is from 30 to 400.

In the prior art processes as mentioned above, however, a considerable amount of monofunctional HFPO polymer having a heptafluoropropyl group at one end is formed as the by-product.

Quite unexpectedly, a difunctional HFPO polymer having a dispersity Mw/Mn of up to 1.10 is obtained by employing such means as adding a compound of 2 to 6 carbon atoms having ether bonds to a difunctional polymerization initiator solution as a second solvent to reduce the viscosity of the initiator solution at the polymerization temperature, thoroughly agitating the polymerization solution for maintaining the solution homogeneous, adding HFPO at a strictly controlled feed rate, and pretreating the initiator solution with a perfluoroolefin at a temperature above the polymerization temperature. Additionally, the resulting polymer has a low content of monofunctional HFPO polymer. Therefore, when the difunctional HFPO polymer is used as a raw material for liquid rubber, the rubber compound has improved flow properties and least variants among lots, and cured rubber having satisfactory physical properties is obtained.

In a first aspect, the invention provides a hexafluoropropene oxide polymer represented by the following general formula (1):

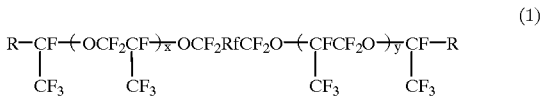

wherein R is —COF, —I, —Br, —CH$_2$OH, —CH$_2$OCH$_2$CH=CH$_2$, —COOR$^1$ or —CONR$^2$R$^3$ wherein R$^1$, R$^2$ and R$^3$ are independently hydrogen or monovalent hydrocarbon groups of 1 to 20 carbon atoms which may contain a nitrogen, oxygen, silicon or sulfur atom, R$^2$ and R$^3$ may be the same or different, or R$^2$ and R$^3$, taken together, form a ring with the nitrogen atom; Rf is a perfluoroalkylene group of 1 to 6 carbon atoms or a perfluorooxyalkylene group of 2 to 10 carbon atoms having an ether bond, which may contain a cyclic structure; and x and y are positive numbers and the sum of x and y is from 30 to 400. The polymer has a dispersity Mw/Mn of up to 1.10, the dispersity being given as a weight average molecular weight (Mw) divided by a number average molecular weight (Mn).

In a second aspect, the invention provides a hexafluoropropene oxide polymer product obtained by feeding hexafluoropropene oxide to a compound represented by the following general formula (2):

wherein Rf is as defined above. The polymer product consists essentially of a polymer represented by the following general formula (1a):

wherein Rf is as defined above, x and y are positive numbers and the sum of x and y is from 30 to 400. The polymer product contains n moles of FOC—CF(CF$_3$)— terminal groups and m moles of CF$_3$CF$_2$CF$_2$— terminal groups in a relationship satisfying 2m/(m+n)<0.15. The polymer product has a dispersity Mw/Mn of up to 1.10.

In a third aspect, the invention provides a process for preparing a hexafluoropropene oxide polymer, comprising the steps of dissolving in an aprotic polar solvent having at least 4 ether bonds a polymerization initiator of formula (2) to form a polymerization initiator solution; treating the polymerization initiator solution with a perfluoroolefin at a temperature higher than a polymerization temperature; adding a hydrocarbon solvent having 1 to 3 ether bonds in a molecule to the polymerization initiator solution before or after the treatment; and feeding hexafluoropropene oxide to the treated polymerization initiator solution for effecting polymerization of hexafluoropropene oxide at the polymerization temperature, typically of −45° C. to −30° C. thereby yielding a reaction product containing as the main component a hexafluoropropene oxide polymer of formula (1) wherein R is—COF, the reaction product having a dispersity Mw/Mn of up to 1.10. Preferably, the reaction product consists essentially of a polymer of formula (1a) defined above, and satisfies the relationship 2m/(m+n)<0.15 wherein n is a molar number of FOC—CF(CF$_3$)— to terminal groups and m is a molar number of CF$_3$CF$_2$CF$_2$— terminal groups.

DETAILED DESCRIPTION OF THE INVENTION

The hexafluoropropene oxide (HFPO) polymers of the invention are represented by the general formula (1).

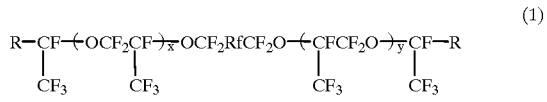

Herein, R is —COF, —I, —Br, —CH$_2$OH, —CH$_2$OCH$_2$CH=CH$_2$, —COOR$^1$ or —CONR$^2$R$^3$. R$^1$, R$^2$ and R$^3$ are independently hydrogen or monovalent hydrocarbon groups of 1 to 20 carbon atoms which may contain at least one atom other than carbon and hydrogen, such as nitrogen, oxygen, silicon or sulfur. Alternatively, R$^2$ and R$^3$, taken together, form a ring with the nitrogen atom. It is noted that R$^2$ and R$^3$ in —CONR$^2$R$^3$ may be identical or different.

The monovalent hydrocarbon groups of 1 to 20 carbon atoms, preferably 1 to 12 carbon atoms, represented by R$^1$ to R$^3$ include unsubstituted monovalent hydrocarbon groups, for example, alkyl groups such as methyl, ethyl, propyl, butyl, hexyl, cyclohexyl, octyl and decyl, alkenyl groups such as vinyl, allyl, propenyl, butenyl and hexenyl, aryl groups such as phenyl, tolyl, xylyl and naphthyl, aralkyl groups such as benzyl and phenylethyl, and substituted monovalent hydrocarbon groups wherein some or all of the hydrogen atoms in the foregoing unsubstituted monovalent hydrocarbon groups are replaced by halogen atoms such as chlorine, fluorine and bromine, cyano groups or alkoxy groups.

Of the hetero atoms which can be incorporated in the monovalent hydrocarbon groups, oxygen intervenes in the form of —O—; nitrogen intervenes in the form of —NH— or —NR'— wherein R' is a monovalent hydrocarbon group of 1 to 12 carbon atoms, preferably 1 to 8 carbon atoms, for example, alkyl such as methyl or ethyl, alkenyl such as vinyl, or aryl such as phenyl; sulfur intervenes in the form of —S— or —SO$_2$—; and silicon intervenes in the form of the following formulae:

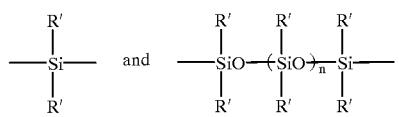

wherein R' is as defined above and letter a is an integer of 0 to 10, especially 0 to 4.

Exemplary rings formed by —NR$^2$R$^3$ in —CONR$^2$R$^3$ are given below.

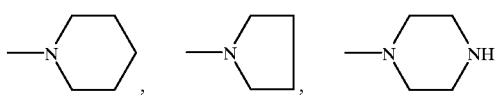

Exemplary groups represented by —COOR$^1$ and —CONR$^2$R$^3$ are given below. These groups may be derived by well-known processes or the process illustrated in Examples to be described later.

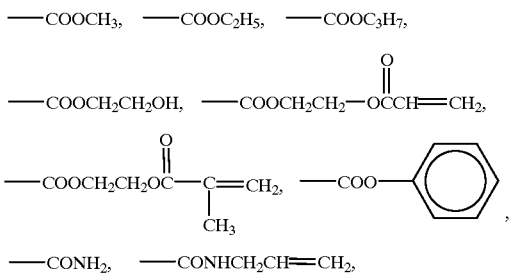

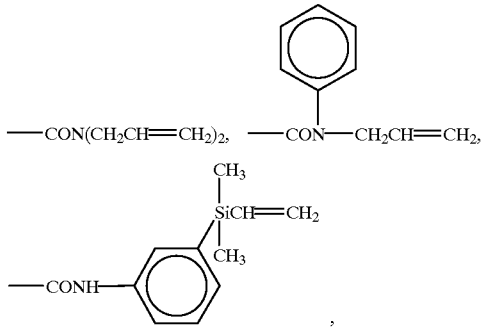

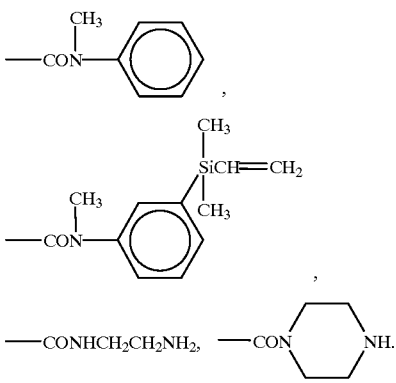

Rf is a perfluoroalkylene group of 1 to 6 carbon atoms or a perfluorooxyalkylene group of 2 to 10 carbon atoms having an ether bond, which group may contain a cyclic structure.

Examples of the perfluoroalkylene group or perfluorooxyalkylene group represented by Rf are given below.

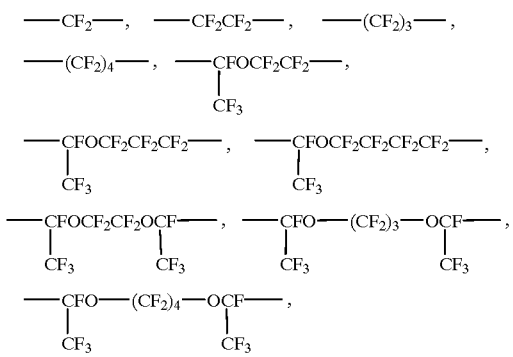

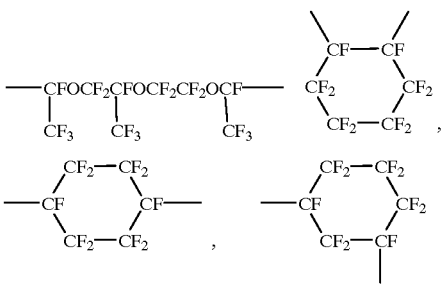

In formula (1), x and y are positive numbers, the sum of x and y is from 30 to 400.

The HFPO polymers of the invention preferably have a number average degree of polymerization of 30 to 400, more preferably 30 to 200, and a dispersity Mw/Mn of up to 1.10, preferably 1.00 to 1.05. The dispersity is defined as a weight average molecular weight (Mw) divided by a number average molecular weight (Mn), that is, Mw/Mn. If the number average degree of polymerization is less than 30, then polymers have a reduced molecular chain length and are sometimes unsuited when used as rubber material. If the number average degree of polymerization is more than 400, a substantial amount of monofunctional HFPO polymer may be admixed, resulting in undercured rubber material. If Mw/Mn is greater than 1.10, cured rubber properties including tensile strength, elongation and tear strength become deteriorated.

The HFPO polymer can be obtained by feeding HFPO to a compound of the following general formula (2):

$$CsOCF_2—Rf—CF_2OCs \qquad (2)$$

wherein Rf is a perfluoroalkylene group of 1 to 6 carbon atoms or a perfluorooxyalkylene group of 2 to 10 carbon atoms having an ether bond, which may contain a cyclic structure, followed by polymerization. This compound is referred to as a polymerization initiator. This process typically yields a difunctional HFPO polymer having —CF(CF$_3$)COF at both ends represented by the following general formula (1a).

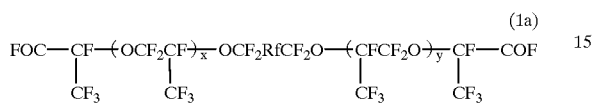

Often, along with the polymer of formula (1a), the product may contain a monofunctional HFPO polymer having a heptafluoroproyl (CF$_3$CF$_2$CF$_2$—) group at one end, which is formed according to the following reaction scheme A and derived from the polymerization initiator.

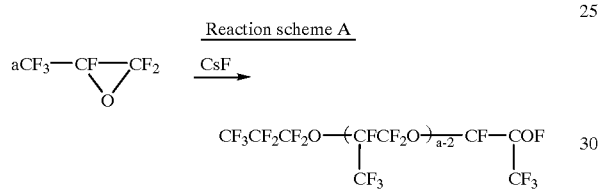

In this case, the molar number (n) of FOC—CF(CF$_3$)— terminal groups and the molar number (m) of CF$_3$CF$_2$CF$_2$— terminal groups in the HFPO polymer or product should satisfy the relationship: 2m/(m+n)<0.15. In order that the HFPO polymer be used as a raw material for liquid rubber, the content of monofunctional polymer, represented by 2m/(m+n), is preferably less than 0.15, especially up to 0.10. It is understood that 2m/(m+n) represents the molar ratio of monofunctional polymer to difunctional polymer because the total molar number of a polymer mixture is represented by (m+n)/2, the molar number of monofunctional polymer is equal to m, and therefore, (molar number of monofunctional polymer)/(total molar number of polymer mixture) is equal to m/(m+n)/2=2m/(m+n). In other others, the HFPO polymer of the invention is a product of high purity containing the polymer of formula (1a) as the main component.

The process of producing a HFPO polymer having a narrow dispersity Mw/Mn according to the invention is not critical. One advantageous process of producing a HFPO polymer is by polymerizing HFPO in a mixture of an aprotic polar solvent having at least 4 ether bonds in the molecule, designated a first solvent, and a hydrocarbon solvent having 1 to 3 ether bonds in the molecule, designated a second solvent. The addition of the second solvent is effective for reducing the viscosity of the initiator solution at the polymerization temperature. The process further involves the steps of thoroughly agitating the polymerization solution for maintaining the solution homogeneous, and adding HFPO at a strictly controlled feed rate.

The polymerization initiator used herein is preferably in the form of a solution which is obtained by adding a compound having a carbonyl group such as a ketone or acid halide to a mixture of an aprotic polar solvent (first solvent) and an alkali metal fluoride. Such a polymerization initiator solution may be prepared by known methods as described in U.S. Pat. No. 3,660,315, for example. Cesium fluoride is the preferred alkali metal fluoride. Exemplary preferred aprotic polar solvents (first solvent) are glymes such as tetraglyme and triglyme, more preferably tetraglyme and other glymes having at least 4 ether bonds, especially at least 5 ether bonds, in a molecule. Examples of the compound having a carbonyl group are given below.

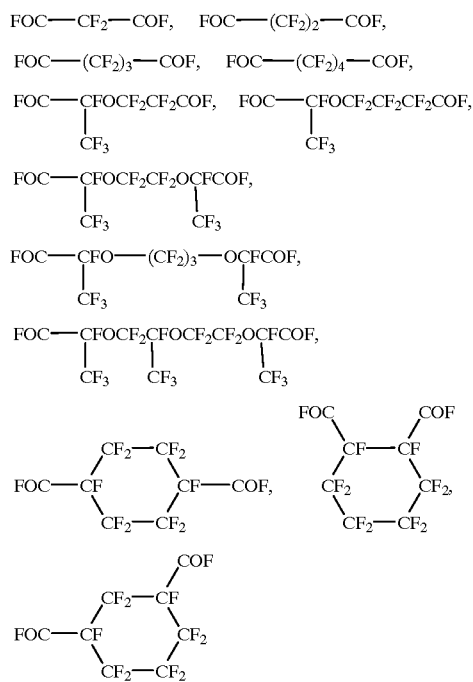

A polymerization initiator solution is prepared by adding the compound having a carbonyl group to a mixture of the aprotic polar solvent (first solvent) and the alkali metal fluoride. In the polymerization initiator solution, the compound having a carbonyl group reacts with the alkali metal fluoride to form a corresponding alcolate.

More specifically, the polymerization initiator which is advantageously used herein is a compound represented by the following formula (2):

$$CsOCF_2—Rf—CF_2OCs \qquad (2)$$

wherein Rf is as defined above.

In the polymerization initiator solution, the polymerization initiator is preferably present at a concentration of 10 to 60% by weight, especially 25 to 45% by weight.

The second solvent to be added to the polymerization initiator solution may be selected from the solvents which are uniformly miscible with the polymerization initiator solution even at a low temperature of −30° C. or lower and have a freezing point of −50° C. or lower. Desirable are hydrocarbon compounds having 1 to 3 ether bonds in a molecule, especially of 2 to 6 carbon atoms, for example, dimethyl ether, diethyl ether, ethyl methyl ether, methyl propyl ether, ethylene glycol dimethyl ether, and tetrahydrofuran. The second solvent is added in order to lower the viscosity of the polymerization initiator solution at a polymerization temperature of −40° C. to −30° C. and to increase agitation efficiency. The second solvent is preferably added in such amounts that the weight ratio of first solvent to second solvent may be from 90:10 to 10:90, more preferably from 80:20 to 20:80. An appropriate amount of the second solvent added is about 5 to 60 parts by weight per 100 parts by weight of the polymerization initiator solution. More than 60 parts of the second solvent could increase the formation of a by-product or monofunctional polymer. Preferably, the second solvent is previously dried, especially to a water content of 50 ppm or lower.

In the next step, a perfluoroolefin such as hexafluoropropene (HFP) is added to a mixture of the polymerization initiator solution and the second solvent for reaction to produce an oligomer of the perfluoroolefin. This step or pretreatment is effective in order to remove the chain transfer-inducing substances (e.g., protonic substances, cesium fluoride and hydrogen fluoride formed therefrom) which are present in the polymerization initiator solution and the second solvent, allowing polymerization to start smoothly when HFPO is subsequently fed. The pretreatment may be performed before the second solvent is added to the polymerization initiator solution, although the pretreatment is preferably performed on a mixture of the polymerization initiator solvent and the second solvent.

The perfluoroolefins used for pretreatment are those of 2 to 9 carbon atoms, especially 3 to 6 carbon atoms, with exemplary perfluoroolefins being shown below.

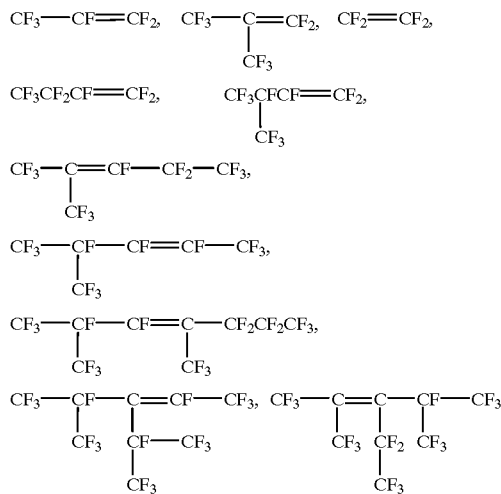

Of these perfluoroolefins, the following are especially preferred.

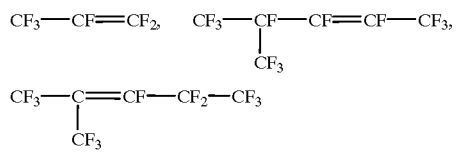

The amount of perfluoroolefin used is not critical although the perfluoroolefin is typically used in an amount of about 0.5 to 100 parts, especially about 3 to 30 parts by weight per 100 parts by weight of the polymerization initiator solution.

When the perfluoroolefin is added for reaction, the temperature is above the polymerization temperature to be described later, typically −30° C. to −50° C. preferably −25° C. to 30° C. Reaction requires a longer time at too lower temperature' whereas the initiator can be decomposed at too higher temperatures. The reaction time is not critical. At reaction temperatures of −25° C. to 30° C. the reaction time including the time required for the addition of perfluoroolefin usually ranges from about 10 minutes to about 2 hours, preferably from about 20 minutes to about 1 hour.

In the reactor, the reaction solution containing the polymerization initiator solution, the second solvent and optional perfluoroolefin is cooled with stirring, to which HFPO is added whereupon a difunctional HFPO polymer is produced. Hexafluoropropene (HFP) may be added at the same time as the addition of HFPO. While the reaction solution gradually thickens with the progress of polymerization, the addition of HFP dilutes the reaction solution and increases its fluidity. During polymerization, the reaction solution is preferably maintained at a temperature of −45° C. to −30° C. At temperatures lower than −45° C. the reaction solution increases its viscosity and thixotropy and becomes difficult to effectively agitate. Under such circumstances, the reaction product having lost fluidity adheres in part to the reactor inner wall or agitator blades to hinder uniform agitation, resulting in a polymer having a wide dispersity. Temperatures higher than −30° C. would allow chain transfer reaction to take place, resulting in formation of a monofunctional HFPO polymer.

Agitation is important for maintaining uniform fluidity for the entire reaction solution. The type of agitator differs with the shape and size of reactor. Usually, agitators of anchor, paddle, spiral ribbon and impeller types are used. The number of revolutions is not critical and may be adjusted for optimum efficient agitation in accordance with the shape of agitator blade.

The supply of HFPO is preferably carried out in a continuous manner using a flow rate regulator such as a mass flow controller. HFPO supply at a constant rate is necessary for maintaining the temperature of the reaction solution within an appropriate range. An appropriate hourly feed rate of HFPO is about 3 to 15 mol, preferably about 5 to 10 mol per mol of the polymerization initiator. The amount of HFPO fed may be determined as appropriate in accordance with the desired molecular weight and may broadly range from about 30 to 400 mol per mol of the polymerization initiator. Since a greater molar amount of HFPO fed is accompanied by a non-negligible amount of monofunctional polymer admixed in the resulting HFPO polymer, the amount of HFPO fed is often from about 30 to 200 mol per mol of the polymerization initiator.

With respect to the supply of HFP, HFP may be fed simultaneously with HFPO in an amount corresponding to ¼ to ¾ of the amount (weight) of HFPO.

At the end of HFPO supply, agitation is continued for a further 1 or 2 hours. The reaction solution is then heated and the end product is separated. In this way, there is obtained a HFPO polymer product consisting essentially of a difunctional HFPO polymer, satisfying $2m/(m+n)<0.15$, and having a narrow dispersity $Mw/Mn \leq 1.10$ because the formation of a monofunctional HFPO polymer as mentioned above is minimized.

The thus obtained difunctional HFPO polymer is terminated with —CF(CF$_3$)COF groups. Various useful HFPO polymers of the above formula (1) can be synthesized therefrom by converting the terminal groups into other functional groups —CF(CF$_3$)—R.

Specifically, —I or —Br can be introduced into the polymer, as shown below, by reacting the terminal groups —COF with a corresponding lithium halide to convert the terminal groups into —COX, followed by UV irradiation. Note that X is Br or I.

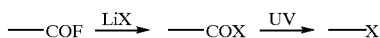

Groups —CH$_2$OH can be introduced by reducing the terminal groups —COF with NaBH$_4$ or LiAlH$_4$. Groups —CH$_2$OCH$_2$CH=CH$_2$ can be introduced by well-known methods such as by reacting terminal groups —CH$_2$OH with YCH$_2$CH=CH$_2$ wherein Y is a halogen atom such as Cl. Groups —COOR$^1$ can be introduced by reacting with a corresponding alcohol in the presence of a base as shown below.

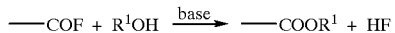

Groups —CONR$^2$R$^3$ can be introduced by similarly reacting with a corresponding primary or secondary amine as shown below.

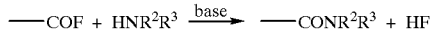

The HFPO polymers of the invention are advantageously used as a raw material for liquid rubber and also find application as coating agents, tackifiers, paint additives, and resin-modifying agents.

There has been described a HFPO polymer having a narrow dispersity. When it is used as a raw material for liquid rubber, the rubber compound has least variants among lots, that is, consistent properties, and cured rubber has least variants in quality and always exhibits satisfactory physical properties.

EXAMPLE

Examples of the invention are given below by way of illustration and not by way of limitation.

Example 1

A reactor having an interior volume of 0.5 liter and equipped with an anchor type agitator blade was charged with 13 g of an initiator solution containing 5.0×10$^4$ mol/g of CsOCF$_2$CF(CF$_3$)OCF$_2$CF$_2$OCF(CF$_3$)CF$_2$OCs in tetraglyme and 4.0 g of ethylene glycol dimethyl ether. The contents were agitated at 180 rpm while the reactor was cooled in a coolant bath adjusted at −10° C.

Step 1: At the time when the internal temperature of the reactor reached −7° C. 1.9 g of HFP was fed at a rate of 3.8 g/hour.

Step 2: The coolant bath was reset to a temperature of −40° C. At the time when the temperature of the liquid in the reactor reached −38° C. 1.9 g of HFP was further fed at a rate of 3.8 g/hour.

Step 3: Then, 108 g of HFPO at a rate of 7.2 g/hour and 54 g of HFP at a rate of 3.6 g/hour were fed over about 15 hours. For the adjustment of feed rates, mass flow controllers were used. During the HFPO supply, the liquid in the reactor was at a temperature in the range of −38° C. to −35° C.

At the end of HFPO supply, agitation was continued for a further one hour, and the coolant bath was gradually warmed up to room temperature. In this duration, generation of some heat was ascertained and evaporation of HFP was observed.

The reactor contents were poured into 100 g of ethanol. After thorough agitation, the lower layer was again washed with 100 g of ethanol, and this was allowed to stand for phase separation. By taking out the lower layer, removing solids by filtration, and stripping off volatiles at 120° C. and 10 mmHg, 98 g of a colorless clear ethyl ester-terminated HFPO polymer was obtained.

By $^{19}$F-NMR analysis of the oily HFPO polymer, the number average degree of polymerization and the content of heptafluoropropyl group were determined. Analysis was also carried out using a gel permeation chromatograph MALLS-GPC coupled to a multi-angle light scattering photometer.

$^{19}$F-NMR

The number average degree of polymerization and the monofunctional HFPO polymer content 2m/(m+n) were determined as follows.

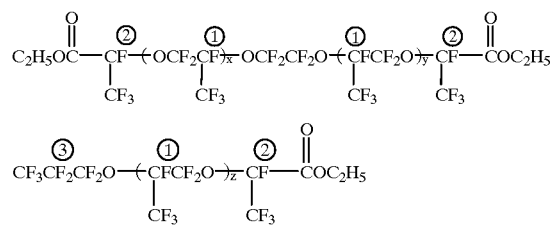

Number average degree of polymerization = 2r/(s+t/2)
2m/(m+n) = t/(s+t/2)

|  | Chemical shift (ppm) | Integration ratio |
|---|---|---|
| (1) | −145.4 | r |
| (2) | −132.3 | s |
| (3) | −130.7 | t |

MALLS-GPC

Measurement was carried out by the following equipment under the following conditions.

Main: Shodex GPC SYSTEM-21 by Showa Denko K.K.
Multi-angle light scattering photometer: DOWN DSP by Wyatt Technology
Column: Shodex KF-803 by Showa Denko K.K.
Solvent: hexafluorobenzene
Column temperature: 35° C.
Flow rate: 1.0 ml/min
Sample concentration: 5 mg/ml

Examples 2–5

The procedure of Example 1 was repeated except that the amounts and duration of HFPO and HFP supply and the amount of ethylene glycol dimethyl ether added were changed.

Example 6

A 30-liter stainless steel reactor was charged with 1.20 kg of the polymerization initiator solution used in Example 1 and 0.36 kg of ethylene glycol dimethyl ether. The contents were agitated at 120 rpm by means of an anchor type agitator blade while the reactor was cooled by circulating a coolant at −10° C. through the jacket.

Step 1: At the time when the internal temperature of the reactor reached −5° C. 0.17 kg of HFP was fed at a rate of 0.17 kg/hour.

Step 2: The coolant was reset to a temperature of −43° C. At the time when the temperature of the liquid in the reactor reached −35° C. 0.17 kg of HFP was further fed at a rate of 0.17 kg/hour.

Step 3: Then, 10.0 kg of HFPO at a rate of 0.21 kg/hour and 5.2 kg of HFP at a rate of 0.11 kg/hour were fed over about 48 hours. For the adjustment of feed rates, mass flow controllers were used. During the HFPO supply, the liquid in the reactor was at a temperature in the range of −38° C. to −35° C.

At the end of HFPO supply, agitation was continued for a further one hour, and the coolant was gradually warmed up to room temperature. In this duration, generation of some heat was ascertained and evaporation of HFP was observed.

An approximately 100-g portion was taken out of the reaction solution and worked up as in Example 1, obtaining an ethyl ester-terminated HFPO polymer.

Comparative Examples 1–4

The procedure of Example 1 was repeated except that the amounts and duration of HFPO and HFP supply, and the number of revolutions for agitation were changed, and ethylene glycol dimethyl ether was omitted.

Comparative Example 5

The procedure of Example 6 was repeated except that the amounts and duration of HFPO and HFP supply were changed, and ethylene glycol dimethyl ether was omitted.

The results are shown in Table 1.

Note: The amount of monoglyme added and the amounts of HFP fed in Steps 1 and 2 are expressed by parts by weight per 100 parts by weight of the initiator; and the amount of HFP fed in Step 3 are expressed by parts by weight per 100 parts by weight of HFPO.

Example 7

Synthesis of allyl-terminated HFPO polymer

The procedure of Example 6 was repeated by using the same equipment as in Example 6, but changing the amount of the polymerization initiator solution. There was obtained a HFPO polymer terminated with —COF having a number average degree of polymerization of 35, a Mw/Mn of 1.02, and a 2m/(m+n) value of 0.005. With stirring, a mixture of 4.7 g allylamine and 7.1 g triethylamine was added to 200 g of the HFPO polymer and reaction was effected at 50 to 60° C. for about one hour. At the end of reaction, the formed salt was filtered off. To the solution were added 4 g of activated carbon powder and 200 g of perfluorooctane, followed by agitation for about 4 hours and filtration again. From the filtrate, volatiles were distilled off at 120° C. and 5 mmHg.

A colorless, clear oily liquid was left as the non-volatile. On analysis, this oily liquid was found to have the following terminal structure.

TABLE 1

| | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Amount of monoglyme | 31 | 31 | 38 | 38 | 31 | 30 | 0 | 0 | 0 | 0 | 0 |
| RPM | 180 | 180 | 180 | 200 | 200 | 120 | 180 | 120 | 0 | 180 | 120 |
| Amount of HFP fed in Step 1 | 15 | 15 | 15 | 15 | 15 | 14 | 0 | 0 | 15 | 15 | 15 |
| Amount of HFP fed in Step 2 | 15 | 15 | 15 | 15 | 15 | 14 | 0 | 0 | 15 | 15 | 15 |
| Amount of HFP fed in Step 3 | 50 | 50 | 40 | 50 | 50 | 52 | 50 | 50 | 50 | 50 | 50 |
| Amount of HFPO (moles of HFPO/ moles of initiator) | 100 | 200 | 35 | 65 | 150 | 100 | 35 | 100 | 35 | 100 | 105 |
| Number average degree of polymerization ($^{19}$F-NMR) | 95 | 183 | 35 | 63 | 141 | 96 | 32 | 85 | 34 | 90 | 92 |
| 2m/(m + n) | 0.053 | 0.128 | 0.006 | 0.013 | 0.083 | 0.056 | 0.084 | 0.22 | 0.04 | 0.12 | 0.11 |
| Mw/Mn | 1.03 | 1.04 | 1.05 | 1.03 | 1.04 | 1.02 | 1.13 | 1.24 | 1.18 | 1.20 | 1.21 |

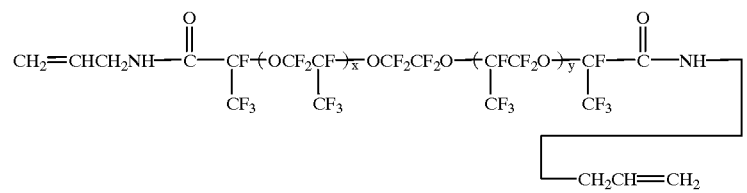

IR absorption spectrum

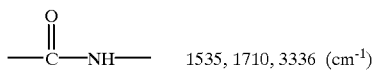  1535, 1710, 3336 (cm$^{-1}$)

| $^1$H-NMR | δ(ppm) |
|---|---|
| N—CH$_2$ | 3.8 |
| CH$_2$= | 5.2 |
| —CH= | 5.8 |
| N—H | 6.6 |

Number average degree of polymerization =35
Mw/Mn=1.02
2m/(m+n)=0.05

Example 8
Synthesis of dimethylvinylsilyl-terminated HFPO polymer

The procedure of Example 7 was repeated except that 14.7 .g of 3-(dimethylvinylsilyl)-N-methylaniline was used instead of allylamine. There was obtained 182 g of a colorless, clear oily liquid. On analysis, this oily liquid was found to have the following terminal structure.

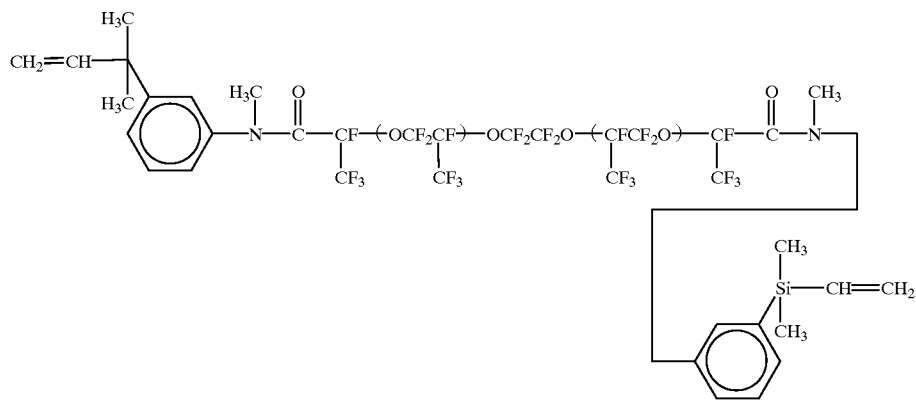

IR absorption spectrum

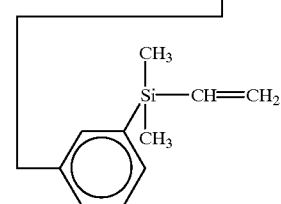  1698 (cm$^{-1}$)

| $^1$H-NMR | δ (ppm) |
|---|---|
| Si—CH$_3$ | 0.3 |
| N—CH$_3$ | 3.3 |
| —CH=CH$_2$ | 5.6–6.2 |
|  | 7.0–7.4 |

Number average degree of polymerization =35
Mw/Mn=1.02
2m/(m+n)=0.05

Example 9

By repeating the same procedure as in Example 8 except that a HFPO polymer terminated with —COF having a number average degree of polymerization of 96, a Mw/Mn of 1.02 and a single terminus content 2m/(m+n) of 0.03, a HFPO polymer having a dimethylvinylsilyl group introduced at each end was synthesized.

To 100 parts by weight of this HFPO polymer, 20 parts of fumed silica with a specific surface area of 300 m$^2$/g and treated with Compound A shown below was added. After mixing and heat treatment, the mixture was milled on a three-roll mill. Then, 0.3 part by weight of a 50% toluene solution of ethynylcyclohexanol, 0.2 part by weight of a toluene solution of a catalyst in the form of chloroplatinic acid modified with Compound B shown below (solution's platinum concentration 0.5% by weight), and 3.3 parts by weight of Compound C shown below were added to the mixture. Thorough mixing yielded a curable composition.

The curable composition was cured at 150° C. for one hour. The cured part was examined for physical properties, finding a JIS-A scale hardness of 45, a tensile strength of 96 kgf/cm$^2$, an elongation of 410%, and a tear strength of 28 kgf/cm.

Compound A

[(CH$_3$)$_3$Si]$_2$NH

Compound B

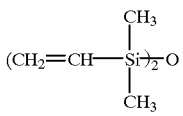

Compound C

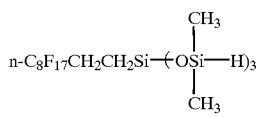

Comparative Example 6

By repeating the same procedure as in Example 8 except that a HFPO polymer terminated with —COF having a number average degree of polymerization of 92, a Mw/Mn of 1.21 and a single terminus content 2m/(m+n) of 0.11, a HFPO polymer having a dimethylvinylsilyl group introduced at each end was synthesized. Using this polymer, a curable composition was formulated as in Example 9. The curable composition was cured at 150° C. for one hour. The cured part was examined for physical properties, finding a JIS-A scale hardness of 43, a tensile strength of 32 kgf/cm$^2$, an elongation of 230%, and a tear strength of 7 kgf/cm.

Japanese Patent Application No. 105853/1998 is incorporated herein by reference.

Reasonable modifications and variations are possible from the foregoing disclosure without departing from either the spirit or scope of the present invention as defined by the claims.

What is claimed is:

1. A hexafluoropropene oxide polymer represented by the following general formula (1):

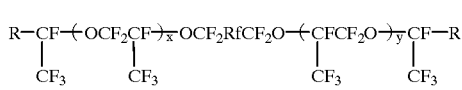
(1)

wherein R is —COF, —I, —Br, —CH$_2$OH, —CH$_2$OCH$_2$CH=CH$_2$, —COOR$^1$ or —CONR$^2$R$^3$ wherein R$^1$, R$^2$ and R$^3$ are independently hydrogen or monovalent hydrocarbon groups of 1 to 20 carbon atoms which may contain a nitrogen, oxygen, silicon or sulfur atom, R$^2$ and R$^3$ may be the same or different, or R$^2$ and R$^3$, taken together, form a ring with the nitrogen atom, Rf is a perfluoroalkylene group of 1 to 6 carbon atoms or a perfluorooxyalkylene group of 2 to 10 carbon atoms having an ether bond, which may contain a cyclic structure, and x and y are positive numbers and the sum of x and y is from 30 to 400, said polymer having a dispersity Mw/Mn of up to 1.10, the dispersity being given as a weight average molecular weight (Mw) divided by a number average molecular weight (Mn).

2. The hexafluoropropene oxide polymer of claim 1 having a number average degree of polymerization of 30 to 400.

3. A hexafluoropropene oxide polymer product obtained by feeding hexafluoropropene oxide to a compound represented by the following general formula (2):

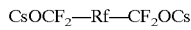 (2)

wherein Rf is a perfluoroalkylene group of 1 to 6 carbon atoms or a perfluorooxyalkylene group of 2 to 10 carbon atoms having an ether bond, which may contain a cyclic structure, said polymer product consisting essentially of a polymer represented by the following general formula (1a):

(1a)

wherein Rf is as defined above, x and y are positive numbers and the sum of x and y is from 30 to 400, said polymer product containing n moles of FOC—CF(CF$_3$)— terminal groups and m moles of CF$_3$CF$_2$CF$_2$— terminal groups in a relationship satisfying 2m/(m+n)<0.15, said polymer product having a dispersity Mw/Mn of up to 1.10, the dispersity being given as a weight average molecular weight (Mw) divided by a number average molecular weight (Mn).

4. The hexafluoropropene oxide polymer product of claim 3 having a number average degree of polymerization of 30 to 400.

5. A process for preparing a hexafluoropropene oxide polymer, comprising the steps of:

dissolving in an aprotic polar solvent having at least 4 ether bonds a polymerization initiator represented by the following general formula (2):

 (2)

wherein Rf is a perfluoroalkylene group of 1 to 6 carbon atoms or a perfluorooxyalkylene group of 2 to 10 carbon atoms having an ether bond, which may contain a cyclic structure, to form a polymerization initiator solution, treating the polymerization initiator solution with a perfluoroolefin at a temperature higher than a polymerization temperature, adding a hydrocarbon solvent having 1 to 3 ether bonds in a molecule to the polymerization initiator solution before or after the treatment, and feeding hexafluoropropene oxide to the treated polymerization initiator solution for effecting polymerization of hexafluoropropene oxide at the polymerization temperature, thereby yielding a reaction product containing as the main component a hexafluoropropene oxide polymer of formula (1) as set forth in claim 1 wherein R is —COF, said reaction product having a dispersity Mw/Mn of up to 1.10, the dispersity being given as a weight average molecular weight (Mw) divided by a number average molecular weight (Mn).

6. The process of claim 5 wherein the reaction product consists essentially of a polymer represented by the following general formula (1a):

(1a)

wherein Rf is a perfluoroalkylene group of 1 to 6 carbon atoms or a perfluorooxyalkylene group of 2 to 10 carbon atoms having an ether bond, which may contain a cyclic structure, x and y are positive numbers and the sum of x and y is from 30 to 400, said reaction product containing n moles of FOC—CF(CF$_3$)— terminal groups and m moles of CF$_3$CF$_2$CF$_2$— terminal groups in a relationship satisfying 2m/(m+n)<0.15.

7. The process of claim 5 wherein the polymerization temperature is in the range of −45° C. to −30° C.

* * * * *